(12) United States Patent
Garner et al.

(10) Patent No.: US 11,180,587 B2
(45) Date of Patent: Nov. 23, 2021

(54) POLYMERIZATION OF PROPYLENE

(71) Applicant: Chevron Phillips Chemical Company LP, The Woodlands, TX (US)

(72) Inventors: Bryan M. Garner, Alvin, TX (US); Anthony O. Parker, Houston, TX (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 163 days.

(21) Appl. No.: 16/713,849

(22) Filed: Dec. 13, 2019

(65) Prior Publication Data

US 2021/0179746 A1    Jun. 17, 2021

(51) Int. Cl.

| | |
|---|---|
| *E21B 7/00* | (2006.01) |
| *E21B 7/02* | (2006.01) |
| *E21B 47/06* | (2012.01) |
| *C08F 110/00* | (2006.01) |
| *C08F 110/04* | (2006.01) |
| *C08F 110/06* | (2006.01) |
| *B01J 19/00* | (2006.01) |
| *B01J 19/06* | (2006.01) |
| *B01J 19/24* | (2006.01) |

(52) U.S. Cl.
CPC ......... *C08F 110/06* (2013.01); *B01J 19/0013* (2013.01); *B01J 19/06* (2013.01); *B01J 19/2465* (2013.01); *B01J 2219/00094* (2013.01); *B01J 2219/00103* (2013.01)

(58) Field of Classification Search
CPC ... E21B 7/00; E21B 7/02; E21B 7/022; E21B 47/00; E21B 47/06; C08F 110/00; C08F 110/04; C08F 110/06; B01J 19/00; B01J 19/06; B01J 19/24; B01J 19/2455; B01J 19/2465; B01J 2219/00; B01J 2219/00049; B01J 2219/00051; B01J 2219/00074; B01J 2219/00087; B01J 2219/00094; B01J 2219/00103
See application file for complete search history.

(56) References Cited

U.S. PATENT DOCUMENTS

| | | | |
|---|---|---|---|
| 3,248,179 | A | 4/1966 | Norwood |
| 6,670,431 | B2 | 12/2003 | Kendrick et al. |
| 6,916,892 | B2 | 7/2005 | Tharappel et al. |
| 9,260,541 | B2 * | 2/2016 | Blackmon ............. C08F 210/06 |
| 9,310,137 | B2 * | 4/2016 | Odi ........................... C08F 2/01 |
| 9,593,189 | B1 * | 3/2017 | Hottovy ............... B01J 19/0006 |
| 2008/0132656 | A1 * | 6/2008 | Lee ....................... C08F 210/16 526/64 |
| 2013/0036070 | A1 | 2/2013 | Ng | |

FOREIGN PATENT DOCUMENTS

| | | |
|---|---|---|
| EP | 2960279 A1 | 12/2015 |
| WO | 2006009946 A2 | 1/2006 |

* cited by examiner

*Primary Examiner* — Natasha E Young
(74) *Attorney, Agent, or Firm* — Conley Rose, P.C.

(57) ABSTRACT

Disclosed are a method and system for propylene polymerization utilizing a loop slurry reactor. The method can include polymerizing propylene in a loop slurry reactor under bulk polymerization conditions to produce polypropylene. The propylene polymerization system can include i) a loop slurry reactor and a heat exchange system that is configured to cool the legs of the loop slurry reactor and/or ii) an inlet manifold that is configured to connect flashline heaters to a separator.

20 Claims, 5 Drawing Sheets

POLYMERIZATION OF PROPYLENE

TECHNICAL FIELD

The present disclosure relates to the polymerization of propylene.

BACKGROUND

Polypropylene can be prepared by polymerization of propylene in one or more reactors in which feed materials such as monomer, comonomer, catalyst, activator, chain transfer agent, and catalyst diluent are introduced. The polymerization reaction within the reactor yields polypropylene as part of a polymerization product. The propylene can be recovered, and remaining portions of the polymerization product (e.g., unreacted propylene, unreacted comonomer, and catalyst diluent) can be further processed, typically downstream from the reactor in monomer recovery systems. The polypropylene can be a homopolymer, random copolymer, or block copolymer.

An ongoing need exists for improving propylene polymerization methods and systems.

SUMMARY

Disclosed herein is a method for polymerization of propylene in a loop slurry reactor. The method may include polymerizing propylene in a loop slurry reactor under bulk polymerization conditions to produce polypropylene. In the method, a space time yield (STY) for the step of polymerizing is greater than 0.36 and less than 0.60 ton polypropylene/hr/m$^3$ of the loop slurry reactor. Various operating conditions can be utilized in the method, including producing polypropylene in the loop slurry reactor at a production rate in a range of from about 75 tons/hr to about 90 tons/hr, utilizing a ratio of the production rate to the coolant flow rate is in a range of from about 1:40 to about 1:65 tons/hr:m$^3$/hr, utilizing a ratio of the production rate to the temperature difference is in a range of from about 11:1 to about 20:1 tons/hr:° C., utilizing a ratio of the production rate to a surface area of the coolant contact surface is in a range of from about 0.0352:1 to about 0.637:1 tons/hr:m$^2$, and utilizing a ratio of the production rate to the coolant flow rate to the temperature difference is in a range of from about 1:40:0.087 tons/hr:m$^3$/hr:° C. to about 1:65:0.050 tons/hr:m$^3$/hr:° C. In aspect, the method can additionally include discharging a polymerization product through at least three continuous take-off valves such that an average discharge flow rate is in a range of about 20 to about 30 tons polypropylene/hr/valve, flowing the polymerization product through a plurality of flashline heaters (each couple to a continuous take-off valve) to a separator, wherein each of flashline heater has an overall pressure drop in a range of about 3.89 kPa/m to about 4.97 kPa/m, and separating, in the separator, the polymerization product into a polypropylene product stream and a vapor product stream. Aspects of the method include recycling the vapor product stream to the loop slurry reactor. Alternative aspects include flowing a portion of the vapor product stream to a propylene recovery system that is configured to recovery propylene from the vapors and recycle propylene to the loop slurry reactor. In aspects, the polypropylene product can be degassed to recovery degassed propylene, and the degassed vapors can flow to the propylene recovery system.

Also disclosed herein is a propylene polymerization system that can have a loop slurry reactor and a heat exchange system. The loop slurry reactor has vertical legs and bends, where each vertical leg is coupled to an adjacent vertical leg by one of the bends. The heat exchange system has cooling passes and a heat exchanger. Each cooling pass is coupled to the heat exchanger and configured to cool only two of the vertical legs of the loop slurry reactor.

Also disclosed herein is a propylene polymerization system that can have a loop slurry reactor, continuous take-off valves fluidly coupled to the loop slurry reactor, flashline heaters coupled to the continuous take-off valves, an inlet manifold having an inlet side connected or otherwise coupled to each of the flashline heaters, and a separator connected or otherwise coupled to an outlet side of the inlet manifold.

BRIEF DESCRIPTION OF THE DRAWINGS

The following figures form part of the present specification and are included to further demonstrate certain aspects of the present invention. The invention may be better understood by reference to one or more of these figures in combination with the detailed description of specific embodiments presented herein.

While the inventions disclosed herein are susceptible to various modifications and alternative forms, only a few specific embodiments have been shown by way of example in the drawings and are described in detail below. The figures and detailed descriptions of these specific embodiments are not intended to limit the breadth or scope of the inventive concepts or the appended claims in any manner. Rather, the figures and detailed written descriptions are provided to illustrate the inventive concepts to a person of ordinary skill in the art and to enable such person to make and use the inventive concepts.

DETAILED DESCRIPTION

The figures described above and the written description of specific structures and functions below are not presented to limit the scope of what Applicants have invented or the scope of the appended claims. Rather, the figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms. Lastly, the use of a singular term, such as, but not limited to, "a," is not intended as limiting of the number of items. Also, the use of relational terms, such as, but not limited to, "top," "bottom," "left," "right," "upper," "lower," "down," "up," "side," and the like are used in the written description for clarity in specific reference to the figures and are not intended to limit the scope of the invention or the appended claims.

The terms "configured to", "configured for use", "adapted for use", and similar language is used herein to reflect that the particular recited structure or procedure is used in an olefin polymerization system or process. For example, unless otherwise specified, a particular structure "configured for use" means it is "configured for use in an olefin polymerization reactor system" and therefore is designed, shaped, arranged, constructed, and/or tailored to effect an olefin polymerization, as would have been understood by the skilled person.

The terms "conduit" and "line" are interchangeable, and as used herein, refer to a physical structure configured for the flow of materials therethrough, such as pipe or tubing. The materials that flow in the "conduit" or "line can be in the gas phase, the liquid phase, the solid phase, or a combination of these phases.

The term "stream" as used herein refers to a physical composition of materials that flow through a "conduit" or "line".

Disclosed herein are a system and method for propylene polymerization. The system and method generally implement bulk polymerization conditions and operate at a reactor space time yield (STY) that is greater than previously implemented in a loop slurry reactor configured for propylene polymerization. For example, a current STY for propylene polymerization is about 0.273 ton polypropylene/hr/m$^3$ of the reactor (2.27 lb polypropylene/hr/gallon of the reactor). Without changing reactor volume, the disclosed system and method can achieve a STY greater than 0.36 and less than 0.60 ton polypropylene/hr/m$^3$ of the loop slurry reactor (greater than 3 and less than 5 lb polypropylene/hr/gallon of the loop slurry reactor). Additionally, the disclosed system and method utilize various operating conditions and configurations (e.g., for continuous take-off valves, loop reactor cooling circuits, flashline heater-to-separator configuration) that are different from those previously used for propylene polymerization.

Figure 1:
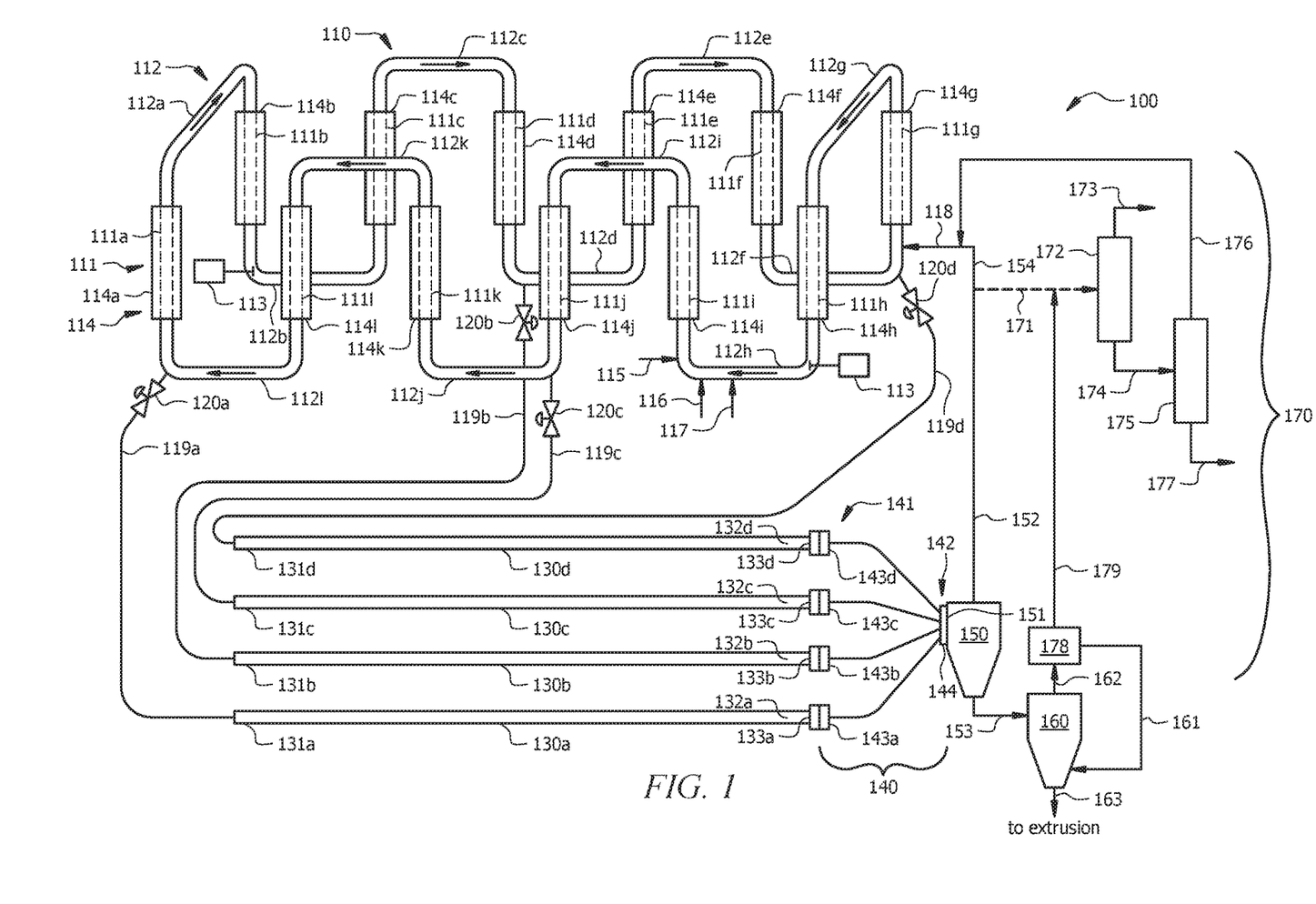
FIG. 1 illustrates an exemplary process flow diagram of a propylene polymerization system in accordance with aspects of the disclosure.

Turning now to the figures, FIG. 1 illustrates a propylene polymerization system 100 in accordance with aspects of the disclosure. The propylene polymerization system 100 generally includes a loop slurry reactor 110, at least three continuous take-off valves 120a-d, flashline heaters 130a-d, an inlet manifold 140, a separator 150, a degassing vessel 160, and a propylene recovery system 170.

The loop slurry reactor 110 generally has vertical legs 111 (individually shown as legs 111a to 111l), which are also referred to as vertical segments. The loop slurry reactor 110 also has bends 112 (individually shown as bends 112a to 112l), which are also referred to as upper and lower horizontal segments, connecting the vertical legs 111 such that a flowpath in a reaction loop is formed. Each of the vertical legs 111 is parallel to and coupled to an adjacent vertical leg 111 by one of the bends 112. Polymerization of propylene occurs in the reaction zone that is defined by the reaction loop. One or more pumps 113 can be coupled with the flowpath in the loop slurry reactor 110 and configured (e.g., via motor/impeller arrangement) to circulate the slurry in the flowpath loop. The pumps or circulators can be axial, radial, or mixed flow. In aspects, the loop slurry reactor 110 can have a volume of about 151 m$^3$ to about 208 m$^3$ (40,000 gallons to 55,000 gallons); alternatively, about 170 m$^3$ to about 189 m$^3$ (45,000 gallons to about 50,000 gallons); alternatively, about 174 m$^3$ (46,000 gallons); alternatively, about 178 m$^3$ (47,000 gallons); alternatively, about 182 m$^3$ 48,000 gallons); alternatively, about 185 m$^3$ (49,000 gallons).

Each bend 112a to 112l connects to two of the vertical legs 111a to 111l. In FIG. 1, bend 112a connects to legs 111a and 111b, bend 112b connects to legs 111b and 111c, bend 112c connects to legs 111c and 111d, bend 112d connects to legs 111d and 111e, bend 112e connects to legs 111e and 111f, bend 112f connects to legs 111f and 111g, bend 112g connects to legs 111g and 111h, bend 112h connects to legs 111h and 111i, bend 112i connects to legs 111i and 111j, bend 112j connects to legs 111j and 111k, bend 112k connects to legs 111k and 111l, and bend 112l connects to legs 111l and 111a.

Each vertical leg 111a to 111l connects to two of the bends 112a to 112l. Leg 111a connects to bends 112a and 112l, leg 111b connects to bends 112a and 112b, leg 111c connects to bends 112b and 112c, leg 111d connects to bends 112c and 112d, leg 111e connects to bends 112d and 112e, leg 111f connects to bends 112e and 112f, leg 111g connects to bends 112f and 112g, leg 111h connects to bends 112g and 112h, leg 111i connects to bends 112h and 112i, leg 111j connects to bends 112i and 112j, leg 111k connects to bends 112j and 112k, and leg 111l connects to bends 112k and 112l.

Leg 111a connects to bends 112a and 112l, leg 111b connects to bends 112a and 112b, leg 111c connects to bends 112b and 112c, leg 111d connects to bends 112c and 112d, leg 111e connects to bends 112d and 112e, leg 111f connects to bends 112e and 112f, leg 111g connects to bends 112f and 112g, leg 111h connects to bends 112g and 112h, leg 111i connects to bends 112h and 112i, leg 111j connects to bends 112i and 112j, leg 111k connects to bends 112j and 112k, and leg 111l connects to bends 112k and 112l.

In aspects, at least some of the vertical legs 111 may include a cooling jacket. FIG. 1 illustrates cooling jackets 114 (shown individually as jackets 114a to 114l) on each of the respective vertical legs 111 (shown individually as legs 111a to 111l). The cooling jackets 114 may generally wrap around an outer surface of the vertical legs 111. The propylene polymerization reactions disclosed herein are exothermic; thus, reaction temperature in the loop slurry reactor 110 may be controlled by removing heat from the loop slurry reactor 110, i.e., by utilizing the cooling jackets 114. Coolant flows through each cooling jacket 114a to 114l and absorbs the heat generated in the loop slurry reactor 110 by contacting the outer surface of the respective leg 111a to 111l to which the cooling jacket 114a to 114l is attached. In each cooling jacket 114a to 114l, the coolant warms due to the heat received from the respective leg 111a to 111l and flows from the respective cooling jacket 114a to 114l to a heat exchanger. The flow of coolant to remove heat from the loop slurry reactor 110 in cooling passes to and from a heat exchanger is described in more detail for FIG. 2.

While the loop slurry reactor 110 in FIG. 1 includes twelve vertical legs 111a to 111l and twelve bends 112a to 112l, it is contemplated that the loop slurry reactor 110 may include more or fewer legs 111 and bends 112 than are shown in FIG. 1. Generally, the number of legs 111 equals the number of bends 112 in the loop slurry reactor 110. The legs 111 are generally of a linear tube shape. The bends 112 may be of any shape or form that connects to two of the vertical legs 111 and allows a reaction mixture to flow from a first leg of the two vertical legs 111, through the bend 112, and into the second leg of the two vertical legs 111. For example, in some configurations, the bends 112 may have a continuous curvature (e.g., have a curved U-shape) rather than a square U-shape as is shown in FIG. 1; alternatively, the bends 112 may have a square U-shape as shown in FIG. 1; alternatively, some of the bends 112 may have a continuous curvature while others of the bends 112 may have a square U-shape.

In aspects, the inside diameter of the loop slurry reactor 110 can be in a range of from about 0.3048 m to about 0.914 m (12 in to 36 in). In additional aspects, the outside diameter of the loop slurry reactor 110 can be in a range of from about 0.3048 m to about 0.914 m (12 in to 36 in). The loop slurry reactor 110 can have an inner diameter that is the same for the entire loop; alternatively, a first portion (e.g., one or more portions near a discharge line) can have an inner diameter than is larger than a second portion of the loop reactor 110, with both portions having inner diameters in a range of from about 0.3048 m to about 0.914 m (12 in to 36 in).

A propylene feed stream 115 is configured to feed propylene monomer to the reaction zone in the loop slurry reactor 110. The propylene feed stream 115 may flow in a propylene feed conduits or pipes that is/are connected to the loop slurry reactor 110 (e.g., to one of the legs 111 or one of the bends 112). The propylene feed stream 115 may contain greater than 95, 96, 97, 98, 99, 99.5, or 99.9 wt % propylene based on a total weight of the feed stream 115. The propylene feed stream 115 may additionally contain ethane, propane, n-butane, isobutane, pentane, nitrogen, hydrogen, oxygen, any impurity found in monomer feed streams, or a combination thereof. In some aspects, the propylene feed stream 115 may be polymerization grade propylene stream (e.g., having at least about 99.5 wt % propylene and less than about 0.5 wt % of components other than propylene based on a total weight of the propylene feed stream 115); alternatively, the propylene feed stream 115 may be an intermediate grade propylene stream (e.g., having from about 95 wt % to about 99.5 wt % propylene and greater than about 0.5 wt % and less than about 5 wt % of components other than propylene based on a total weight of the propylene feed stream 115). In some aspects, an intermediate grade propylene stream may contain from about 0.1 to about 4 wt % propane. In some aspects, a polymerization grade propylene stream may contain from about 0.1 to about 0.5 wt % propane.

An optional comonomer feed stream 116 is configured to feed a comonomer to the loop slurry reactor 110. The comonomer feed stream 116 may flow in a comonomer conduit or pipe that is connected to the loop slurry reactor 110 (e.g., to one of the legs 111 or one of the bends 112). While aspects of the disclosure include the homopolymerization of propylene to form a homopolymer of polypropylene (e.g., use of the propylene feed stream 115 with no comonomer feed stream 116), alternative aspects include the copolymerization of propylene and a comonomer, such as ethylene, 1-butene, 1-pentene, 1-hexene, 1-octene or 1-decene. An amount of comonomer relative an amount of propylene may be fed to the loop slurry reactor 110 such that comonomer is present in the resulting propylene copolymer ranging from about 0.01 wt % to about 20 wt %; alternatively, from about 0.01 wt % to about 10 wt %; alternatively, from about 0.01 wt % to about 5 wt %; alternatively, from about 0.1 wt % to about 4 wt % based on a total weight of the propylene copolymer.

A catalyst feed stream 117 is configured to feed a catalyst to the loop slurry reactor 110 for contact with the propylene monomer and optional comonomer under bulk polymerization conditions. The catalyst feed stream 117 may flow in a catalyst feed conduit or pipe that is connected to the loop slurry reactor 110 (e.g., to one of the legs 111 or one of the bends 112). Catalysts may include any catalyst(s) or catalyst system(s) useful for polymerizing propylene monomers. For example, the catalyst(s) or catalyst systems(s) may be selected from a chromium based catalyst, a single site transition metal catalyst including both single and multiple (two or more) metallocene catalyst, a Ziegler-Natta catalyst, or combinations thereof. The catalysts may be activated for subsequent polymerization and may, or may not, be associated with a support material (e.g., may be heterogeneous or homogeneous). In some aspects, the catalyst or catalyst system may be diluted with a diluent; while, in alternative aspects, the catalyst or catalyst system may be fed to the loop slurry reactor 110 as neat material (no dilution). In some aspects, the catalyst or catalyst system may be pre-contacted with propylene monomer in a vessel that is upstream of the loop slurry reactor, and the pre-contact mixture containing the catalyst or catalyst system may be fed to the loop slurry reactor in the catalyst feed stream 117. The pre-contacting vessel may include a batch reactor, a continuous reactor, a loop reactor, a conduit, or a pipe. Suitable catalyst diluents include hydrocarbons which are inert and in liquid phase under feed and polymerization conditions or are super critical fluids under slurry polymerization conditions. For example, suitable catalyst diluents include propane, n-butane, isobutane, n-pentane, isopentane, neopentane, n-hexane, n-heptane, or a combination thereof. In one or more aspects, the catalyst diluent is propane, isobutane, isopentane (i-pentane), or a combination thereof.

A recycle stream 118 is configured to feed unreacted propylene that is recovered from the polymerization product that is discharged from the loop slurry reactor 110, back to the loop slurry reactor 110. The recycle stream 118 may flow in a recycle conduit or pipe that is connected to the loop slurry reactor 110 (e.g., to one of the legs 111 or one of the bends 112). The recycle stream 118 is generally a recycle grade propylene stream containing unreacted propylene. In aspects, the recycle stream 118 may additionally contain nitrogen, unreacted comonomer, hydrogen, oxygen, propane, n-butane, isobutane, n-pentane, isopentane, neopentane, n-hexane, n-heptane, or a combination thereof. In aspects, the recycle stream 118 may contain unreacted propylene recovered from the separator 150, degassing vessel 160, propylene recovery system 170, or a combination thereof, which is described in more detail below.

Discharge streams 119a to 119d are configured to remove polymerization product from the loop slurry reactor 110. Each discharge stream 119a to 119d may flow in a discharge conduit or pipe that is connected to the loop slurry reactor 110. One continuous take-off valve 120a to 120d is contained in the conduit or pipe through which each discharge stream 119a to 119d flows. The propylene polymerization system 100 in FIG. 1 shows four discharge streams 119a to 119d. It is contemplated that only three of the discharge streams 119a to 119d may be configured to handle a flow rate of polymerization product from the loop slurry reactor 110 at a rate of about 75 tons polypropylene/hr, with the fourth discharge stream 119a, 119b, 119c, or 119d being offline for use as backup (e.g., in the event an online continuous take-off valve fails, a valve or discharge stream gets clogged, or a valve or discharge stream otherwise becomes inoperable); alternatively, it is contemplated that four discharge streams 119a to 119d may be configured to handle a flow of polymerization product from the loop slurry reactor 110 at a rate of about 90 tons polypropylene/hr. The conduit through which each discharge stream 119a to 119d flows additionally connects to a respective flashline heater 130a to 130d.

Four continuous take-off valves 120a to 120d (also referred to as CTO valves) are shown fluidly coupled to the loop slurry reactor 110 via discharge streams 119a to 119d, in the propylene polymerization system 100 illustrated in FIG. 1. Each continuous take-off valve 120a to 120d is additionally fluidly coupled to an end 131a to 131d of one of the flashline heater 130a to 130d. In aspects, only three of the continuous take-off valves 120a to 120d may be configured to be online, collectively being configured to withdraw polymerization product from the loop slurry reactor 110 at a rate of about 75 tons polypropylene/hr (e.g., an average flow rate of three CTO valves being 25 tons/hr per valve), with the fourth continuous take-off valve 120a, 120b, 120c, or 120d being offline for use as backup (e.g., in the event an online continuous take-off valve fails, a valve or discharge stream gets clogged, or a valve or discharge stream otherwise becomes inoperable). In alternative aspects, it is contemplated that four continuous take-off valves 120a to 120d may be collectively configured to withdraw polymerization product from the loop slurry reactor 110 at a rate of about 90 tons polypropylene/hr (e.g., an average flow rate of four CTO valves being 22.5 tons/hr per valve). In aspects, each continuous take-off valve 120a to 120d can have an inner diameter of about 1 in to about 3 in (about 2.54 cm to about 7.62 cm); alternatively, about 1.5 in (3.81 cm).

In aspects, the flow of polymerization product through the continuous take-off valves 120a to 120d can generally be continuous, with each valve 120a to 120d being configured to operate at an openness greater than 0% up to 100%. In alternative aspects, any of the continuous take-off valves 120a to 120d can be configured to alternate between an open position and closed position so that the collective operation of the continuous take-off valves 120a to 120d allows for continuous removal of polymerization product from the loop slurry reactor 110.

In alternative aspects, one or more settling legs can be coupled to the loop slurry reactor 110 via one or more of the discharge streams 119a to 119d. In additional aspects, one or more settling legs can be used in some of discharge streams 119a to 119d while continuous-take off valves can be used in other of the discharge streams 119a to 119d.

In other alternative aspects, one or more hydrocyclones can be coupled to the loop slurry reactor 110 via one or more of the discharge streams 119a to 119d. In additional aspects, one or more hydrocyclones can be used in some of discharge streams 119a to 119d while continuous-take off valves can be used in other of the discharge streams 119a to 119d. In additional aspects, one or more hydrocyclones can be used in some of discharge streams 119a to 119d while settling legs can be used in other of the discharge streams 119a to 119d. In additional aspects, one or more hydrocyclones can be used in some of discharge streams 119a to 119d, while continuous-take off valves can be used in other of the discharge streams 119a to 119d, and while settling legs can be used in other of the discharge streams 119a to 119d.

Four flashline heaters 130a to 130d are shown in the propylene polymerization system 100 of FIG. 1. Each flashline heater 130a to 130d has an end 131a to 131d that is fluidly coupled to one of the continuous take-off valves 120a to 120d (e.g., via a respective conduit of a discharge stream 119a to 119d). It is contemplated that only three of the flashline heaters 130a to 130d may be configured to be online, with the fourth flashline heater 130a, 130b, 130c, or 130d being offline for use as backup (e.g., in the event an online continuous take-off valve fails, a valve or discharge stream or flashline heater gets clogged, or a valve or discharge stream or flashline heater otherwise becomes inoperable); alternatively, four flashline heaters 130a to 130d may be configured to be online.

The end 131a to 131d of each flashline heater 130a to 130d is configured to receive polymerization product from the respective discharge stream 119a to 119d. Each flashline heater 130a to 130d is configured to supply heat to the polymerization product so as to vaporize at least a portion of the liquid hydrocarbons (e.g., unreacted propylene, unreacted comonomer, catalyst diluent) contained in the polymerization product as the polymerization product flows through the flashline heater 130a to 130d. In aspects, each flashline heater 130a to 130d can include at least one conduit or pipe having a heat source (e.g., steam jacket(s) or electric heater(s) wrapped around portion(s) of the conduit or pipe) that is configured to supply heat to the polymerization product flowing in the conduit or pipe.

In some aspects, each of the flashline heaters 130a to 130d can be configured as an open flow channel flashline heater, which is a jacketed pipe of a constant diameter that is heated with steam injected in the jacket at one end (e.g., end 131a, 131b, 131c, 131d) and condensate collected from the jacket at the opposite end (e.g., opposite end 132a, 132b, 132c, 132d) of the flashline heater 130a, 130b, 130c, 130d. In the open flow channel configuration, the jacket can include a common collection system for the steam that condenses to water in the jacket after transferring heat to the product mixture that moves through the flashline heater 130a to 130d. The collection system can comprise an open downward angle flow section configured to collect the condensate.

In some alternative aspects, each portion of the conduit or pipe having a heat source may be referred to as a segment of the flashline heater 130a, 130b, 130c, or 130d, and each flashline heater 130a to 130d may be comprised of multiple segments. In some aspects, the diameter of the segments can increase from ends 131a to 131d to opposite ends 132a to 132d. Suitable configurations for the flashline heaters 130a to 130d are discussed further in U.S. Pat. Nos. 8,597,582 and 8,883,940, each of which is incorporated by reference in its entirety.

An inlet manifold 140 is configured to fluidly couple each flashline heater 130a to 130d with the separator 150. The inlet manifold 140 solves the problem found with polymerizing propylene at the production rates and STYs disclosed herein: more discharge streams 119a to 119d, continuous take-off valves 120a to 120d, and flashline heaters 130a to 130d are needed. However, it was found that a single separator 150 can still be used, as opposed to stacking multiple separators, by adapting the flashline heaters 130a to 130d to the separator 150 with the disclosed inlet manifold 140. An inlet side 141 of the inlet manifold 140 may connect to the opposite end 132a to 132d of each of the flashline heaters 130a to 130d, and an outlet side 142 of the inlet manifold 140 may connect to an inlet 151 of the separator 150. In FIG. 1, the inlet manifold 140 has inlet flanges 143a to 143d on the inlet side 141 of the inlet manifold 140 that connect with corresponding outlet flanges 133a to 133d on the opposite ends 132a to 132d of the flashline heaters 130a to 130d. The inlet manifold 140 also has an outlet flange 144 on the outlet side 142 of the inlet manifold 140 that connects to the inlet 151 of the separator 150 (e.g., via a corresponding flange on the inlet 151 of the separator 150).

Polymerization product may flow from the opposite ends 132a to 132d of the flashline heaters 130a to 130d into an inlet side 141 of the inlet manifold 140. The inlet manifold 140 is configured to direct the polymerization product from each flashline heater 130a to 130d into an inlet 151 of the separator 150. The inlet manifold 140 is described in detail in the description for FIGS. 3A to 3E.

The separator 150 may connect to an outlet side 142 of the inlet manifold 140. The separator 150 is configured to receive the polymerization product from the inlet manifold 140 and to separate the polymerization product into a vapor product stream 152 containing hydrocarbons and light components and a polypropylene product stream 153 containing polypropylene and residual hydrocarbons (e.g., unreacted propylene, unreacted comonomer, catalyst diluent, feed impurity hydrocarbons such as propane, etc.) that is entrained in the polypropylene or otherwise residually remaining with the polypropylene. The vapor product stream 152 and the polypropylene product stream 153 may each flow in respective conduits or pipes that are connected to the separator 150. In aspects, the separator 150 may be embodied as a flash tank, a flash vessel, a flash chamber, a cyclone, a high efficiency cyclone, or a centrifuge. Generally, the separator 150 can be a hollow vessel having at least a portion thereof in a conical shape. The top of the separator 150 can have a diameter that is greater than a diameter of the bottom of the separator 150. In some aspects, the separator 150 can have a diameter in a range of about 8 in to about 30 ft (0.203 m to 9.14 m); alternatively, a range of about 1 ft to about 30 ft (0.305 m to 9.14 m); alternatively, from about 8 in to about 12 in (0.203 m to 0.305 m). In aspects where the separator 150 is a cyclone separator, the cone angle of the cyclone separator can be about 45° to about 80°; alternatively, about 50° to about 75°; alternatively, about 60° to about 65°; alternatively, about 45° to about 60°; alternatively, about 60° to about 70°; alternatively, about 70° to about 80°.

In aspects, it is contemplated that the separator 150 includes two vessels. That is, a first vessel of the separator 150 may be embodied as a flash tank, a flash vessel, a flash chamber, a cyclone, a high efficiency cyclone, or a centrifuge having the aspects described herein; and the second vessel can be embodied as a holdup tank, a surge tank, or any vessel having a residence time in a range of at least 5 minutes to about 5 hrs. In such aspects, the outlet of the first vessel through which the polypropylene flows may be directly connected to an inlet of the second vessel; alternatively, the polypropylene outlet of the first vessel may be coupled to the polypropylene inlet of the second vessel via a conduit or pipe. The pipe or conduit that connects the two vessel of the separator 150 may include a continuous valve of similar configuration of continuous take-off valves 120a to 120d that is configured to continuously allow flow of polypropylene (e.g., containing residual hydrocarbons as described herein) from the first vessel to the second vessel where the polypropylene resides for a given residence time before flowing to the degassing vessel 160.

The degassing vessel 160 may be coupled to the separator 150 via polypropylene product stream 153, configured to receive the polypropylene product, and configured to remove at least a portion of a hydrocarbon (e.g., unreacted propylene monomer, any optional olefin comonomer, any catalyst diluent, or combinations thereof) entrained or otherwise remaining within the polypropylene product. The conduit or pipe through which the polypropylene product stream 153 may additionally be connected to the degassing vessel 160. Gas stream 161 can be configured to provide a gas (e.g., nitrogen; an inert hydrocarbon such as ethane, propane, n-butane, isobutane, pentane, or mixtures thereof; ethylene, propylene, or any other hydrocarbon) to the degassing vessel 160. The degassing vessel 160 can be operated at appropriate conditions (e.g., temperature, pressure, inert gas flow rate) such that the inert gas flows through the collection of polypropylene particles present in the degassing vessel 160, removes entrained hydrocarbon from the polyolefin particles, moves upwardly through the degassing vessel 160 with the removed hydrocarbon(s), and exits the degassing vessel 160 along with the previously entrained hydrocarbon in a degas stream 162. The degassed polypropylene product can be recovered via polypropylene stream 163. The gas stream 161, the degas stream 162, and the polypropylene stream 163 may each flow in respective conduits or pipes that are connected to the degassing vessel 160.

The degassing vessel 160 can be configured for plug flow of polypropylene product from top to bottom. The residence time of polypropylene product in the degassing vessel 160 can be at least 10 minutes; alternatively, at least 30 minutes; alternatively, about 1 hr; alternatively, from about 1 hr to about 6 hrs; alternatively, from about 1 hr to about 8 hrs; alternatively, from about 1 hr to about 16 hrs. The operating pressure of the degassing vessel 160 can be a vacuum pressure, atmospheric pressure, or greater than atmospheric pressure. In a particular aspect, the pressure of the degassing vessel 160 can be a pressure in the range of from about 0 psia to about 50 psia (about −0.101 MPaa to about 0.345 MPaa).

While one degassing vessel 160 is shown in FIG. 1, it is contemplated that degassing can take place in two or more degassing vessels operated in parallel and having the same configuration as degassing vessel 160, with the gas stream 161 feeding to each degassing vessel, degas streams combining into degas stream 162, and polypropylene streams combining into polypropylene stream 163. Alternatively, it is contemplated that degassing can take place in two or more degassing vessel connected in series and having the same configuration as degassing vessel 160, with the gas stream 161 feeding to each degassing vessel, degas streams combining into degas stream 162, a polypropylene stream of the first degassing vessel feeding to the second degassing vessel, and so on, until the final degassing vessel produces the polypropylene stream 163. Alternatively still, it is contemplated that degassing can take place in multiple degassing trains operated in parallel, where each train contains two or more degassing vessels connected in series. As with other aspects, the gas stream 161 can be configured to feed to each degassing vessel in the trains, each degassing vessel can produce a degas stream that combines with other degas streams to form the degas stream 162, and the final degassing vessel of each train having a polypropylene stream that combines with other polypropylene streams to form polypropylene stream 163.

In some aspects, it is contemplated that the vapor product stream 152 can recycle unreacted propylene directly to the loop slurry reactor 110 (e.g., via recycle stream 118). Additionally or alternatively, the propylene polymerization system 100 may be configured to split the vapor product stream 152 into a first portion 154 and a second portion 171. The first portion 154 can recycle directly to the loop slurry reactor 110 (e.g., via recycle stream 118). The propylene polymerization system 100 may contain one or more distillation columns 172 and 175 in a propylene recovery system 170 that is configured to receive the second portion 171 of the vapor product stream 152. The propylene recovery system 170 is generally coupled to the separator 150 and to the loop slurry reactor 110, and is configured to recover unreacted propylene from second portion 171 of the vapor product stream 152 containing propylene and other components (e.g., light gases such as nitrogen and hydrogen, unreacted comonomer, catalyst diluent), and to recycle the recovered propylene to the loop slurry reactor 110 (e.g., via stream 176 and recycle stream 118).

The one or more distillation columns 172 and 175 can include a lights column and a heavies column, connected in series in any order. In the propylene recovery system 170 of FIG. 1, the first distillation column 172 is a lights column, and the second distillation column 175 is a heavies column. Within the scope of the propylene polymerization system 100 of FIG. 1, it is contemplated that various equipment associated with monomer and diluent recovery systems (e.g., valves, pumps, accumulators, piping, reboilers, condensers, heaters, compressors, control systems, safety equipment, and the like), while not shown for purposes of clarity, can be included in the propylene recovery system 170 according to techniques known in the art with the aid of this disclosure.

The first distillation column 172 is configured to receive the portion 171 of the vapor product stream 152 and to separate, via distillation, the vapor product stream 152 into a lights overhead stream 173 containing gases lighter than propylene (e.g., nitrogen, hydrogen, oxygen, optional unreacted comonomer of ethylene, or combinations thereof) and a lights bottom stream 174 containing propylene and heavier hydrocarbons (e.g., optional unreacted comonomer of 1-butene or heavier olefin, propane, n-butane, isobutane, n-pentane, isopentane, neopentane, n-hexane, n-heptane, or a combination thereof). The first distillation column 172 can be operated at conditions (e.g., temperature, pressure, number of trays, reflux rate, heating rate, and other parameters for controlling the operation of a distillation column) suitable to recover gases lighter than propylene (e.g., nitrogen, hydrogen, oxygen, optional unreacted comonomer of ethylene, or combinations thereof) in the lights overhead stream 173 and propylene and heavier hydrocarbons in lights bottom stream 174. For example, the first distillation column 172 can be operated at a temperature in a range of from about 50° C. (122° F.) to about 20° C. (68° F.); alternatively, from about 40° C. (104° F.) to about 10° C. (50° F.); alternatively, from about 30° C. (86° F.) to about 5° C. (41° F.), and a pressure in a range of from 0.101 MPaa (14.7 psia) to about 3.64 MPaa (527.9 psia), alternatively, from about 0.108 MPaa (15.7 psia) to about 2.40 MPaa (348 psia), alternatively, from about 0.586 MPaa (85 psia) to about 2.00 MPaa (290 psia).

The second distillation column 175 is configured to receive the lights bottom stream 174 and to separate, via distillation, the lights bottom stream 174 into a heavies overhead stream 176 containing propylene (and optionally propane) and a heavies bottom stream 177 containing C4+ hydrocarbons (e.g., unreacted comonomer of 1-butene or heavier olefin, n-butane, isobutane, n-pentane, isopentane, neopentane, n-hexane, n-heptane, or a combination thereof). The second distillation column 175 can be operated at conditions (e.g., temperature, pressure, number of trays, reflux rate, heating rate, and other parameters for controlling the operation of a distillation column) suitable to recover heavy hydrocarbons in heavies bottom stream 177 and propylene in the heavies overhead stream 176. For example, the second distillation column 175 can be operated at a temperature in a range of from about 15° C. (59° F.) to about 233° C. (451.4° F.), alternatively, from about 20° C. (68° F.) to about 200° C. (392° F.), alternatively, from about 20° C. (68° F.) to about 180° C. (356° F.), and/or a pressure in a range of from about 0.101 MPaa (14.7 psia) to about 3.64 MPaa (527.9 psia), alternatively, from about 0.108 MPaa (15.7 psia) to about 2.40 MPaa (348 psia), alternatively, from about 0.586 MPaa (85 psia) to about 2.00 MPaa (290 psia).

In aspects which utilize portion 171, the portion 171 of the vapor product stream 152 that flows to the propylene recovery system 170 can be in a range of 0 wt % to about 50 wt % of the vapor product stream 152 based on a total weight of the vapor product stream 152.

Additionally or alternatively, the propylene recovery system 170 may contain a polishing unit 178 such as a propylene nitrogen recovery unit (PNRU). The polishing unit 178 is generally coupled to the degassing vessel 160 and to one of the distillation columns 172 and 175, and is configured to separate stream 162 into the gas stream 161 and a residual hydrocarbon stream 179 containing propylene and optionally other residual hydrocarbons. In FIG. 1, the residual hydrocarbon stream 179 can flow in a conduit or pipe that is connected to the conduit or pipe through which the portion 171 of the vapor product stream 152 flows; alternatively, the conduit or pipe through which the residual hydrocarbon stream 179 flows can be directly connected to the first distillation column 172. The polishing unit 178 can utilize any technique for separating the inert gas used for degassing from the residual hydrocarbons, for example, compression, distillation (e.g., utilizing cryogenic and/or vacuum conditions), absorption, membrane separation, condensation, or combinations thereof. In aspects where the inert gas in stream 161 is nitrogen, the polishing unit 178 is a PNRU.

Figure 2:
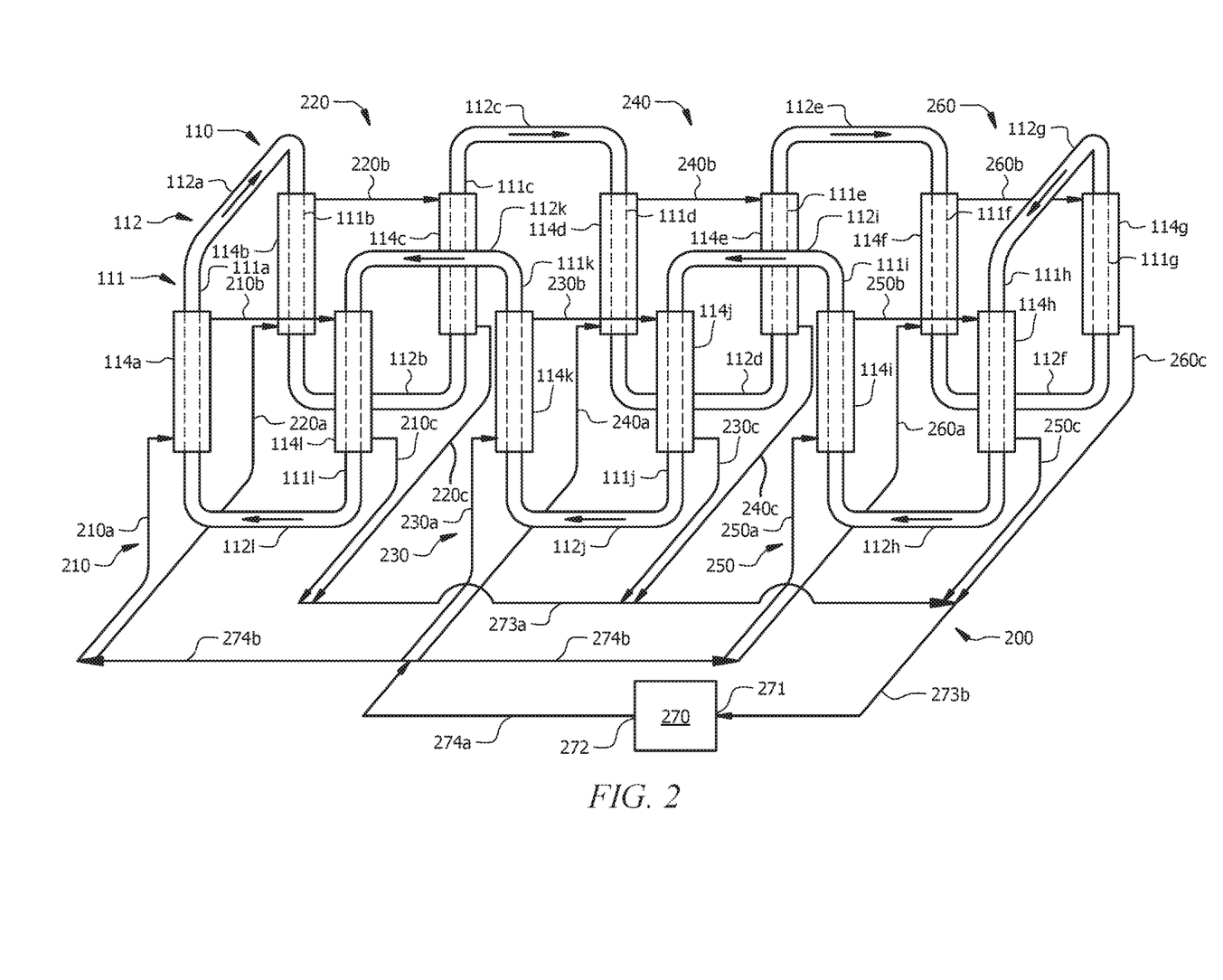
FIG. 2 illustrates an exemplary schematic diagram of the heat exchange system for the loop slurry reactor of FIG. 1.

The propylene polymerization system 100 can additionally include a heat exchange system 200. FIG. 2 illustrates the heat exchange system 200 comprises cooling passes 210, 220, 230, 240, 250, and 260 and a heat exchanger 270. Six cooling passes 210, 220, 230, 240, 250, and 260 are shown in FIG. 2 because the loop slurry reactor 110 has 12 vertical legs 111a to 111k. Each cooling pass 210, 220, 230, 240, 250, and 260 is configured to cool only two vertical legs. For loop slurry reactors having more or fewer vertical legs, the number of passes is the number of legs divided by two, e.g., 2 passes for 4 legs, 3 passes for 6 legs, 4 passes for 8 legs, 5 passes for 10 legs, 7 passes for 14 legs, 8 passes for 16 legs, 9 passes for 18 legs, or 10 passes for 20 legs.

The configuration of cooling passes 210, 220, 230, 240, 250, and 260 is different from those currently utilized in loop slurry reactors because current cooling passes cool 4 vertical legs; whereas, the cooling pass configurations of this disclosure cool only 2 vertical legs. The loop slurry reactor configurations that are available for the disclosed cooling pass configuration include legs and bends in multiples of 2, e.g., 2, 4, 6, 8, 10, 12, 14, 16, 18, and 20 legs, since the cooling passes only cool two legs; whereas, previous cooling pass configurations required the loop slurry reactor 110 to have legs in multiples of 4, e.g., 4, 8, 12, 16, and 20 legs.

Collectively, the cooling passes includes i) cooling jackets 114a to 114k, ii) conduits 210a to 210c, 220a to 220c, 230a to 230c, 240a to 240c, 250a to 250c, 260a to 260c, 273a to 273b, 274a to 274b, and iii) heat exchanger 270 having an inlet 271 and an outlet 272. The heat exchanger 270 can include one or more heat exchange apparatuses, in series or in parallel, and each heat exchange apparatus being coupled to the inlet 271 and the outlet 272.

In aspects, conduits 210a, 220a, 230a, 240a, 250a, and 260a generally connect to a bottom of the respective cooling jacket 114a, 114b, 114k, 114d, 114i, and 114f. Conduits 210b, 220b, 230b, 240b, 250b, and 260b generally connect to a top of respective cooling jacket 114a, 114b, 114k, 114d, 114i, and 114f and to a top of respective cooling jacket 114l, 114c, 114j, 114e, 114h, and 114g. Conduits 210c, 220c, 230c, 240c, 250c, and 260c generally connect to a bottom of the respective cooling jacket 114l, 114c, 114j, 114e, 114h, and 114g.

In FIG. 2, the first cooling pass 210 includes a first cooling jacket 114a of a first leg 111a of two vertical legs 111a and 111l, a second cooling jacket 114l of a second leg 111l of the two vertical legs 111a and 111l, a first coolant conduit 210a coupled to the outlet 272 of the heat exchanger 270 (e.g., via common conduits 274a and 274b) and to the first cooling jacket 114a, a second coolant conduit 210b connected to the first cooling jacket 114a and to the second cooling jacket 114l, and a third coolant conduit 210c coupled to the second cooling jacket 114l and to an inlet 271 of the heat exchanger 270 (e.g., via common conduits 273a and 273b).

The second cooling pass 220 includes a first cooling jacket 114b of a first leg 111b of two vertical legs 111b and 111c, a second cooling jacket 114c of a second leg 111c of the two vertical legs 111b and 111c, a first coolant conduit 220a coupled to the outlet 272 of the heat exchanger 270 (e.g., via common conduits 274a and 274b) and to the first cooling jacket 114b, a second coolant conduit 220b connected to the first cooling jacket 114b and to the second cooling jacket 114c, and a third coolant conduit 220c coupled to the second cooling jacket 114c and to an inlet 271 of the heat exchanger 270 (e.g., via common conduits 273a and 273b).

The third cooling pass 230 includes a first cooling jacket 114k of a first leg 111k of two vertical legs 111j and 111k, a second cooling jacket 114j of a second leg 111j of the two vertical legs 111j and 111j, a first coolant conduit 230a coupled to the outlet 272 of the heat exchanger 270 (e.g., via common conduits 274a and 274b) and to the first cooling jacket 114k, a second coolant conduit 230b connected to the first cooling jacket 114k and to the second cooling jacket 114j, and a third coolant conduit 230c coupled to the second cooling jacket 114j and to an inlet 271 of the heat exchanger 270 (e.g., via common conduits 273a and 273b).

The fourth cooling pass 240 includes a first cooling jacket 114d of a first leg 111d of two vertical legs 111d and 111e, a second cooling jacket 114e of a second leg 111e of the two vertical legs 111d and 111e, a first coolant conduit 240a coupled to the outlet 272 of the heat exchanger 270 (e.g., via common conduits 274a and 274b) and to the first cooling jacket 114d, a second coolant conduit 240b connected to the first cooling jacket 114d and to the second cooling jacket 114e, and a third coolant conduit 240c coupled to the second cooling jacket 114d and to an inlet 271 of the heat exchanger 270 (e.g., via common conduits 273a and 273b).

The fifth cooling pass 250 includes a first cooling jacket 114i of a first leg 111i of two vertical legs 111h and 111i, a second cooling jacket 114h of a second leg 111h of the two vertical legs 111h and 111i, a first coolant conduit 250a coupled to the outlet 272 of the heat exchanger 270 (e.g., via common conduits 274a and 274b) and to the first cooling jacket 114i, a second coolant conduit 250b connected to the first cooling jacket 114i and to the second cooling jacket 114h, and a third coolant conduit 250c coupled to the second cooling jacket 114h and to an inlet 271 of the heat exchanger 270 (e.g., via common conduits 273a and 273b).

The sixth cooling pass 260 includes a first cooling jacket 114f of a first leg 111f of two vertical legs 111f and 111g, a second cooling jacket 114g of a second leg 111g of the two vertical legs 111f and 111g, a first coolant conduit 260a coupled to the outlet 272 of the heat exchanger 270 (e.g., via common conduits 274a and 274b) and to the first cooling jacket 114f, a second coolant conduit 260b connected to the first cooling jacket 114f and to the second cooling jacket 114f, and a third coolant conduit 260c coupled to the second cooling jacket 114g and to an inlet 271 of the heat exchanger 270 (e.g., via common conduits 273a and 273b).

The common conduits 274a and 274b are illustrated as one configuration to flow coolant from the outlet 272 of the heat exchanger 270 to the first coolant conduit 210a, 220a, 230a, 240a, 250a, and 260a of each cooling pass 210, 220, 230, 240, 250, and 260; and it is contemplated that each cooling pass 210, 220, 230, 240, 250, and 260 may include common conduits 274a and 274b or other conduit configurations that may deliver coolant from the heat exchanger 270 to each cooling pass 210, 220, 230, 240, 250, and 260.

The common conduits 273a and 234b are illustrated as one configuration to flow coolant from the inlet 271 of the heat exchanger 270 from the third coolant conduit 210c, 220c, 230c, 240c, 250c, and 260c of each cooling pass 210, 220, 230, 240, 250, and 260; and it is contemplated that each cooling pass 210, 220, 230, 240, 250, and 260 may include common conduits 273a and 273b or other conduit configurations that may deliver coolant from each cooling pass 210, 220, 230, 240, 250, and 260 to the heat exchanger 270. In some aspects, common conduits 273a and 273b are a single conduit to which each third coolant conduit 210c to 260c connects; and/or common conduits 274a and 274b are a single conduit to which each first coolant conduit 210a to 260a connects. In other aspects, any combination of third coolant conduits 210c to 260c can join with one another to form an intermediate conduit which then connects to the common conduits 273a and 273b; and/or any combination of first coolant conduits 210a to 260a can join with one another to form an intermediate conduit which then connects to the common conduits 274a and 274b.

In aspects, the heat exchanger 270 is positioned externally of the loop slurry reactor 110 and configured to control a temperature difference between a first temperature of the coolant entering the heat exchanger 270 and a second temperature of the coolant exiting the heat exchanger 270.

In aspects, the heat exchanger 270 is configured to cool the coolant that is warmed in the cooling passes 210, 220, 230, 240, 250, and 260 of the loop slurry reactor 110. To do so, the heat exchanger 270 can have a coolant contact surface (e.g., plates, tubes, etc.) that is configured to contact the coolant and to absorb heat from the coolant in order to control the temperature of the coolant that leaves the heat exchanger 270 via outlet 272.

In aspects, the heat exchanger 270 has a surface area of a coolant contact surface in a range of about 1,177 m² to about 2,556 m². In additional aspects, the heat exchange system 200 is configured to flow coolant through the cooling passes 210, 220, 230, 240, 250, and 260 at a total flow rate of about 3,100 m³/hr to about 5,500 m³/hr.

In aspects, a first temperature of the coolant entering the inlet 271 of the heat exchanger 270 is from about 4.4° C. (8° F.) to about 6.7° C. (12° F.) warmer than a second temperature of the coolant exiting the outlet 272 of the heat exchanger 270. Put another way, a temperature difference between the first temperature of the coolant entering the heat exchanger 270 and the second temperature of the coolant exiting the heat exchanger 270 can be from about 4.4° C. (8° F.) to about 6.7° C. (12° F.). In aspects where the production rate is about 75 tons polypropylene/hr, the temperature difference can be about 6.5° C. (11.7° F.). In aspects where the production rate is about 90 tons polypropylene/hr, the temperature difference can be about 4.5° C. (8.1° F.)

FIGS. 3A to 3E are various views of the inlet manifold 140 according to the disclosure. The inlet side 141 and outlet side 142 are generally circular in shape in FIGS. 3A to 3E; however, the shape of the inlet side 141 and outlet side 142 is not to be limited to circular, and other shapes, e.g., triangular, square, rectangular, pentagonal, hexagonal, octagonal, etc., are contemplated.

Figure 3A:
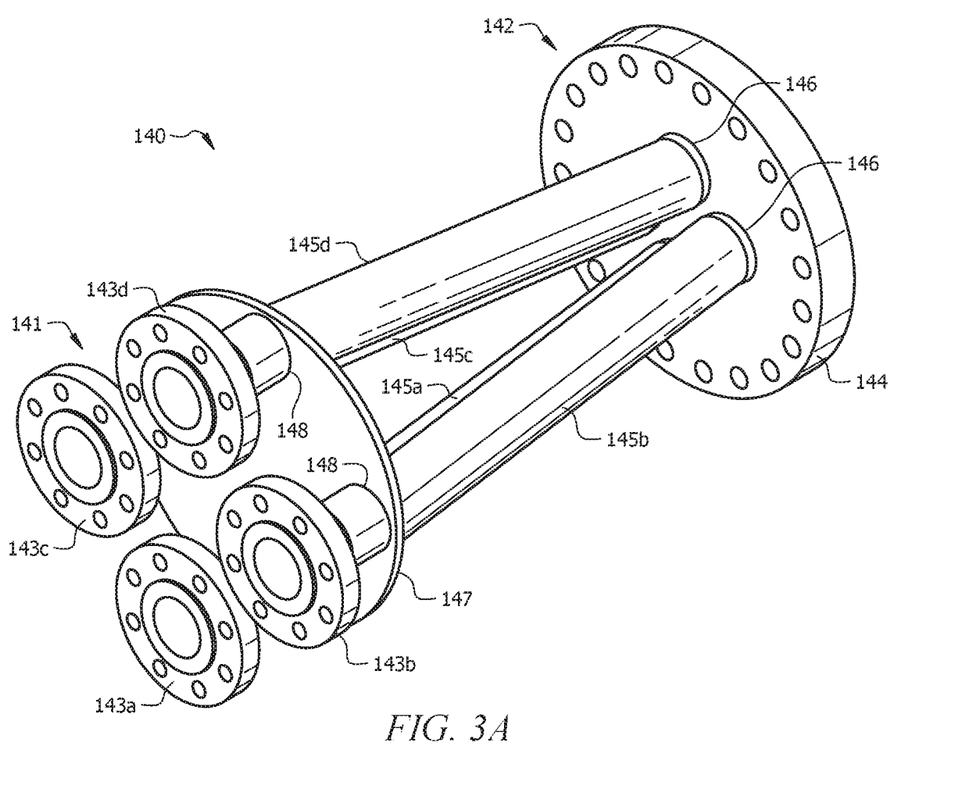
FIGS. 3A to 3E are various views of an inlet manifold according to the disclosure.

FIG. 3A is an isometric view of the inlet manifold 140. The inlet side 141 is the side of the inlet manifold 140 that may connect to the flashline heaters 130a to 130d, and the outlet side 142 of the inlet manifold 140 is the side that may connect to the separator 150.

Four inlet flanges 143a to 143d can be seen on the inlet side 141 of the inlet manifold 140. More or fewer inlet flanges may be included in other embodiments of the inlet manifold 140, depending on the number of flashline heaters that connect with the inlet manifold 140. That is, the number of inlet flanges on the inlet manifold 140 can equal the number of flashline heaters in the propylene polymerization system 100. In aspects, each inlet flange 143a to 143d can be an ASME Class 600 raised-face flange having an inner diameter suitable connection (e.g., via welds) to the manifold conduits 145a to 145d.

One outlet flange 144 can be seen on the outlet side 142 of the inlet manifold 140. The outlet flange 144 can have multiple outlet holes 146 formed therein. Generally, the number of outlet holes equals the number of manifold conduits. In the embodiment shown in FIGS. 1 and 3A to 3E, the inlet manifold 140 has four manifold conduits 145a to 145d and four outlet holes 146 formed in the outlet flange 144. In aspects, the outlet flange 144 can be an ASME Class 600 raised-face flange having an inner diameter in a range of about 10 to about 30 in (25.4 to 76.2 cm); alternatively, about 14 in (35.6 cm). In additional aspects, the outlet flange 144 can be a blind flange, with the outlet holes 146 having a diameter suitable for receiving the manifold conduits 145a to 145d therein, e.g., for manifold conduits having a 4 in (10.2 cm) inner diameter.

Each manifold conduit 145a to 145d is connected to an inlet flange 143a to 143d and to the outlet flange 144. Generally, the number of manifold conduits equals the number of inlet flanges. In FIGS. 1 and 3A to 3E, the inlet manifold 140 has four inlet flanges 143a to 143d and four manifold conduits 145a to 145d. Each manifold conduit 145a to 145d can have an inner diameter in a range of about 1 to about 10 in (2.54 to 25.4 cm); alternatively, about 4 in (10.2 cm).

The inlet manifold 140 can also include a support member 147 having multiple support holes 148 formed therein. Generally, the number of support holes equals the number of manifold conduits. In the embodiment shown in FIGS. 3A to 3E, the support member 147 has four support holes 148. Each of the manifold conduits 145a to 145d extends through on the of the support holes 148 in the support member 147. The support member 147 can have an outer diameter in a range of about 20 to about 30 in (50.8 cm to 76.2 cm); alternatively, about 22.5 in (57.2 cm).

Figure 3B:
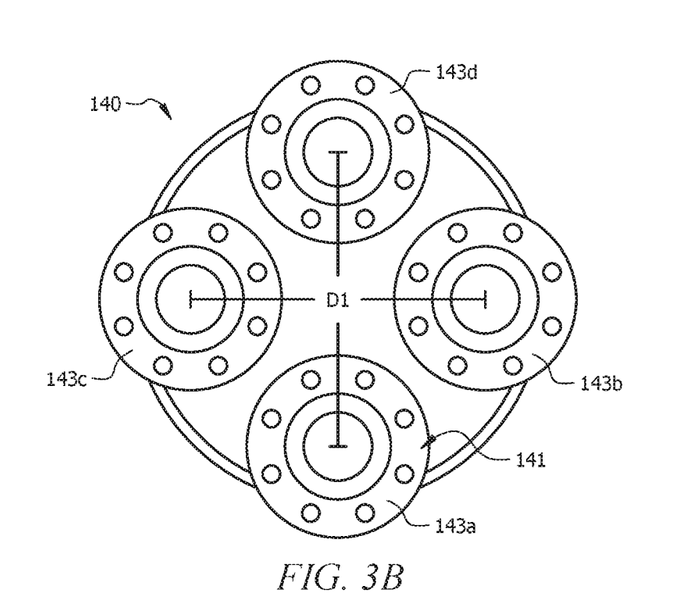

FIG. 3B is a front view of the inlet manifold 140. The inlet flanges 143a to 143d are equally spaced in a counter-clockwise direction starting with inlet flange 143a, then to inlet flange 143b, then to inlet flange 143c, then to inlet flange 143d. A distance D1 between a central axis of inlet flange 143a and a central axis of inlet flange 143d is in a range of about 15 to about 25 in (38.1 to 64.5 cm); alternatively, about 17 in (43.2 cm). The distance, also D1, between a central axis of inlet flange 143b and a central axis of inlet flange 143c is in a range of about 15 to about 25 in (38.1 to 64.5 cm); alternatively, about 17 in (43.2 cm).

Figure 3C:
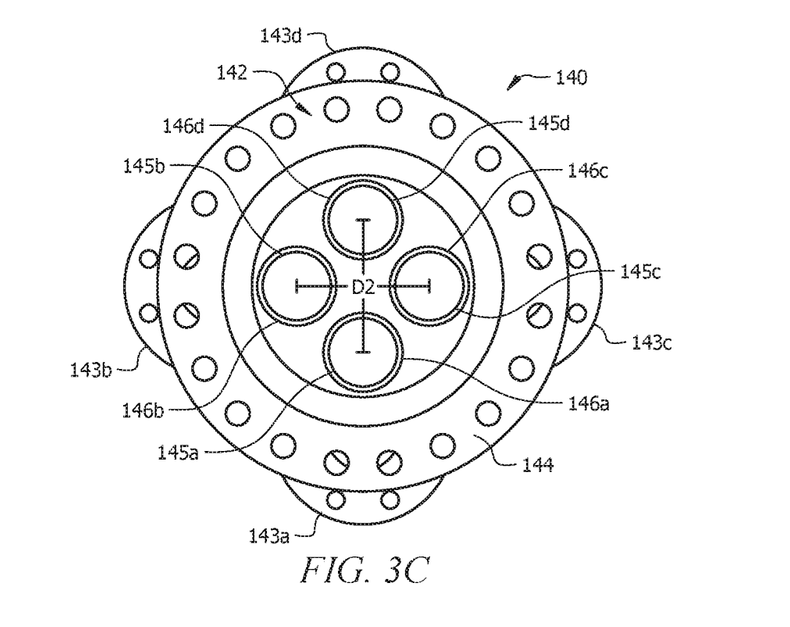

FIG. 3C is a back view of the inlet manifold 140. The holes 146a to 146d and manifold conduits 145a to 145d in the holes 146a to 146d are equally spaced in a clockwise direction staring with hole 146a/conduit 145a, then to hole 146b/conduit 145b, then to hole 146c/conduit 145c, then to hole 146d/conduit 145d. A distance D2 between a central axis of inlet flange 143a and a central axis of inlet flange 143d is in a range of about 5 to about 15 in (12.7 to 38.1 cm); alternatively, about 7.875 in (20 cm). The distance, also D2, between a central axis of inlet flange 143b and a central axis of inlet flange 143c is in a range of about 5 to about 15 in (12.7 to 38.1 cm); alternatively, about 7.875 in (20 cm).

Figure 3D:
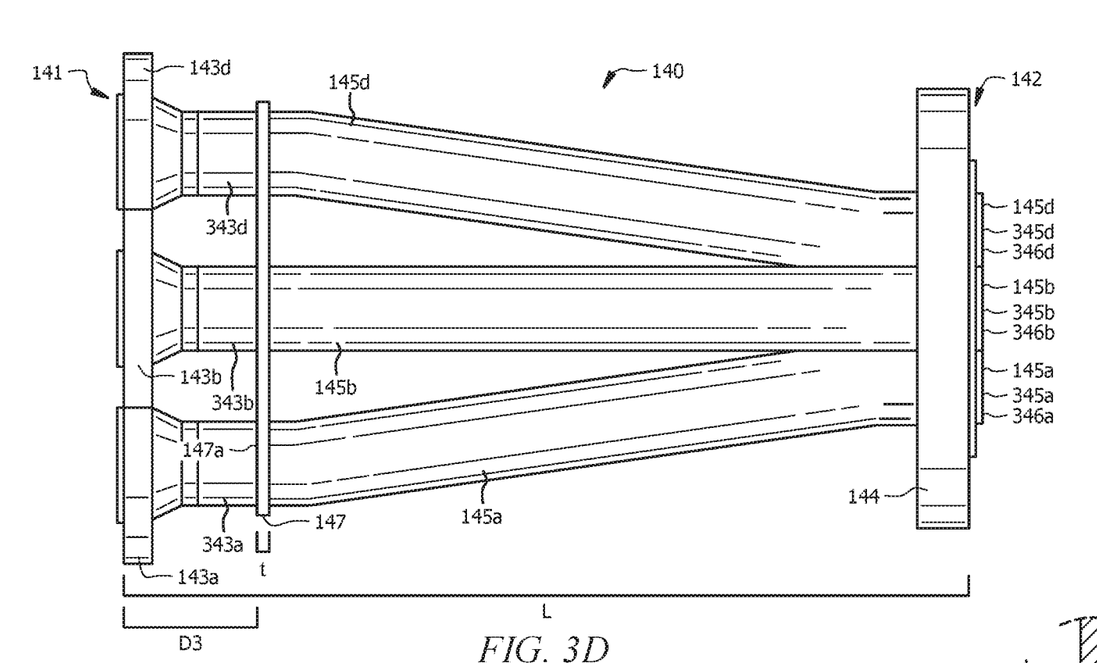

FIG. 3D is a side view of the inlet manifold 140. The total length L of the inlet manifold 140 can be in a range of from about 20 to about 60 in (50.8 to 152.4 cm); alternatively, about 46.75 in (188.7 cm). The support member 147 can have a thickness tin a range of about 0.375 to about 1 in (0.95 cm to 2.54 cm); alternatively, about 0.625 in (1.59 cm).

Conduit 145c cannot be seen in FIG. 3D because it is directly behind manifold conduit 145b. Ends 343a, 343b, and 343d of manifold conduits 145a, 145b, and 145d are connected to the inlet flanges 143a, 143b, and 143d, respectively. Opposite ends 345a, 345b, and 345d of manifold conduits 145a, 145b, and 145d are connected to the outlet flange 144 and extend through the outlet holes (146a, 146b, and 146d in FIG. 3C). Portion 346a, 356b, and 356d of the opposite end 345a, 345b, and 345d of each manifold conduit 145a, 145b, and 145d extends outside the corresponding outlet hole (146a, 146b, and 146d in FIG. 3C) in the outlet flange 144.

In aspects, a distance D3 between the inlet side 141 and a side 147a of the support member 147 that faces the inlet side 141 is in a range of about 100 mm to about 400 mm (3.93 in to 15.75 in); alternatively, about 150 mm to about 200 mm (5.90 in to 7.87 in); alternatively, about 160, 170, 180, or 190 mm (6.29, 6.69, 7.09, or 7.48 in).

Viewing the manifold conduits 145a to 145d in FIGS. 3A and 3D, and comparing distances D1 and D2 in FIGS. 3B and 3C, it can be seen that each of the manifold conduits 145a to 145d is tapered such that the ends 343a to 343d by a distance D1 that is greater than a distance D2 by which the opposite ends 345a to 345d are spaced apart.

Figure 3E:
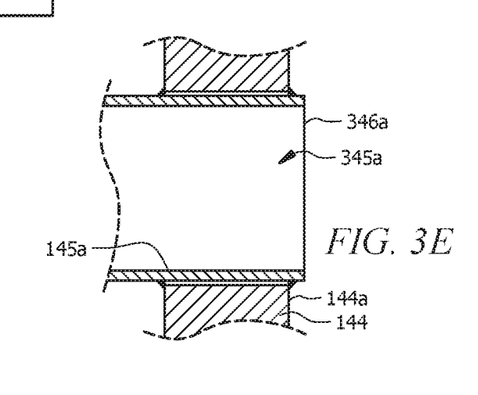

FIG. 3E is isolated cross-sectional view of opposite end 345a of the manifold conduit 145a of the inlet manifold 140. A portion 346a can be seen extending beyond an outer face 144a of the outlet flange 144.

The disclosed method will be described with reference to FIGS. 1, 2, and 3A to 3E. In the disclosed methods, propylene and an optional comonomer(s) is/are polymerized in the loop slurry reactor 110 under polymerization conditions to produce polypropylene (e.g., a homopolymer or a copolymer). In aspects, the polymerization conditions are bulk polymerization conditions where propylene is present as a liquid in the reactor and there is no diluent for the propylene monomer. In aspects, a catalyst diluent that is used to flow the catalyst or catalyst system into the reaction zone of the loop slurry reactor 110 may be present in the loop slurry reactor 110 under the bulk polymerization conditions that are contemplated by this disclosure.

The method may include feeding the various components for polymerizing propylene, e.g., propylene monomer, optional comonomer, catalyst or catalyst system, catalyst diluent, hydrogen, or a combination thereof, to the loop slurry reactor 110 at any location on the loop slurry reactor 110 and in any order.

The method may further include operating the loop slurry reactor 110 such that the polypropylene is produced by polymerizing propylene at a space time yield (STY) greater than 0.36 and less than 0.60 ton polypropylene/hr/m$^3$ of the loop slurry reactor 110 (greater than 3 and less than 5 lb polypropylene/hr/gallon of the loop slurry reactor 110).

The method may further include cooling one or more of the vertical legs 111 of the loop slurry reactor 110 with a coolant flowing at a coolant flow rate (e.g., a total flow rate of coolant through all cooling jackets 114 on legs 111 of the loop slurry reactor 110), and cooling the coolant in one or more heat exchangers 270 (e.g., in the heat exchange system 200 that is positioned externally of the loop slurry reactor 110) so as to control a temperature difference between a first temperature of the coolant entering the heat exchanger 270 and a second temperature of the coolant exiting the heat exchanger 270. In aspects of the method, the heat exchange system 200 has a configuration discussed herein for the propylene polymerization system 100.

Various operating parameters associated with the loop slurry reactor 110 and heat exchange system 200 can be utilized in the disclosed method. In aspects, the method can include producing polypropylene in the loop slurry reactor 110 at a production rate in a range of from about 75 tons/hr to about 90 tons/hr; alternatively, at about 75 tons/hr; alternatively, at about 90 tons/hr. In additional or alternative aspects, the method can include flowing the coolant a coolant flow rate (e.g., a total flow rate of coolant through all cooling jackets 114 on legs 111 of the loop slurry reactor 110) in a range of from about 3,100 m$^3$/hr to about 5,500 m$^3$/hr; alternatively, about 3,150 m$^3$/hr for a production rate of 75 tons/hr; alternatively, about 5,450 m$^3$/hr for a production rate of 90 tons/hr. In additional or alternative aspects, a ratio of the production rate to the coolant flow rate is in a range of from about 1:40 to about 1:65 tons/hr:m$^3$/hr. In additional or alternative aspects, a ratio of the production rate to the temperature difference (e.g., between a first temperature of the coolant entering the heat exchanger 270 and a second temperature of the coolant exiting the heat exchanger 270) is in a range of from about 11:1 to about 20:1 tons/hr:° C. (about 6:1 to about 12:1 tons/hr:° F.); alternatively, about 11.5:1 tons/hr:° C. (6.4:1 tons/hr:° F.) for a production rate of 75 tons/hr; alternatively, about 20:1 tons/hr:° C. (11.1 tons/hr:° F.) for a production rate of 90 tons/hr. In additional or alternative aspects, a ratio of the production rate to a surface area of the coolant contact surface of the heat exchanger 270 (e.g., the sum of all coolant contact surface areas when multiple heat exchange apparatuses are present to form the heat exchanger 270) in the heat exchange system 200 is in a range of from about 0.0352:1 to about 0.637:1 tons/hr:m$^2$. In additional or alternative aspects, a ratio of the production rate to the coolant flow rate to the temperature difference is in a range of from about 1:40:0.087 tons/hr:m$^3$/hr:° C. to about 1:65:0.050 tons/hr:m$^3$/hr:° C. (about 1:40:0.156 tons/hr:m$^3$/hr:° F. to about 1:65:0.09 tons/hr:m$^3$/hr:° F.); alternatively, about 1:40:0.087 tons/hr:m$^3$/hr:° C. (about 1:40:0.156 tons/hr:m$^3$/hr:° F.) for a production rate of 75 tons/hr; alternatively, about 1:65:0.050 tons/hr:m$^3$/hr:° C. (about 1:65:0.09 tons/hr:m$^3$/hr:° F.) for a production rate of 90 tons/hr. In additional or alternative aspects, the loop slurry reactor 110 has a pressure of from about 400 psig to about 1,000 psig (2.76 MPag to 6.89 MPag); alternatively, from about 500 psig to about 900 psig (3.45 MPag to 6.21 MPag); alternatively, from about 600 psig to about 800 psig (4.13 MPag to 5.52 MPag); alternatively, from about 600 psig to about 700 psig (4.13 MPag to 4.83 MPag); alternatively, about 650, 660, 670, 680, or 690 psig (4.48, 4.55, 4.62, 4.69, or 4.76 MPag).

The method can further include discharging a polymerization product comprising polypropylene from the loop slurry reactor 110, e.g., via discharge streams 119a to 119e and continuous take-off valves 120a to 120d. In some aspects, the polymerization product can be discharged through three or four of continuous take-off valves 120a to 120d having an average discharge flow rate of about 20 to about 30 tons polypropylene/hr/valve. In an aspect, discharge is through three continuous take-off valves 120a, 120b, and 120c, and the average discharge flow rate is about 25 tons polypropylene/hr/valve. In an alternative aspect, discharge is through four continuous take-off valves 120a, 120b, 120c, and 120d, and the average discharge flow rate is about 22.5 tons polypropylene/hr/valve. "Average discharge flow rate" is the average flow rate value obtained by adding the flow rate of polypropylene through each continuous take-off valve to obtain a total flow rate value, and dividing the total flow rate value by the number of continuous take-off valves through which polypropylene flows.

The method can further include flowing the polymerization product through one or more flashline heaters (e.g., flashline heaters 130a to 130d) to a separator 150. In aspects, each flashline heater 130a, 130b, 130c, 130d has an overall pressure drop in a range of about 0.17 psi/ft to about 0.22 psi/ft (about 3.89 kPa/m to about 4.97 kPa/m). In aspects, a pressure of the polymerization product between each continuous take-off valve 120a to 120d and each corresponding flashline heater 130a to 130d can be in a range of from about 400 psig to about 500 psig (2.76 MPag to 3.45 MPag); alternatively, about 410 psig to about 450 psig (2.82 MPag to 3.10 MPag); alternatively, about 429 psig to about 440 psig (2.95 MPag to 3.03 MPag).

The method can further include flowing the polymerization product from the flashline heater (e.g., flashline heaters 130a to 130d) into the inlet manifold 140. The inlet manifold 140 in the disclosed method can have any configuration disclosed herein.

The method can further include directing, by the inlet manifold 140, the polymerization product received from the flashline heaters (e.g., flashline heaters 130a to 130d) to an inlet 151 of the separator 150.

The method can further include separating, in the separator 150, the polymerization product into a polypropylene product stream 153 containing polypropylene and residual hydrocarbons (e.g., unreacted propylene, unreacted comonomer, catalyst diluent, etc.) and a vapor product stream 152 (unreacted propylene, unreacted comonomer, catalyst diluent, hydrogen, nitrogen, oxygen, or a combination thereof). In aspects, the separator 150 may operate at a pressure of from about 50 psig to about 500 psig (0.345 MPag to 3.45 MPag); alternatively, from about 100 psig to about 400 psig (0.689 MPag to 2.76 MPag); alternatively, from about 200 psig to about 300 psig (1.38 MPag to 2.07 MPag); alternatively, about 250 psig to about 300 psig (1.72 MPag to 2.07 MPag); alternatively, about 275 psig to about 300 psig (1.89 MPag to 2.07 MPag); alternatively, about 280 to about 290 psig (1.93 MPag to 2.00 MPag); alternatively, about 286 psig (1.97 MPag).

Aspects of the method include recycling all of the unreacted propylene from the vapor product stream 152 directly to the loop slurry reactor 110. Alternative or additional aspects of the method can include splitting the vapor product stream 152 into a first portion 154 and a second portion 171, recycling the first portion 154 containing a portion of the unreacted propylene directly to the loop slurry reactor 110

(e.g., via recycle stream 118), and flowing the second portion 171 containing another portion of the unreacted propylene to a propylene recovery system 170. The advantage of splitting vapor product stream 152 so that a portion 171 flows to a propylene recovery system 170 is that components (e.g., nitrogen, hydrogen, oxygen, unreacted comonomer, catalyst diluent) that build up in the loop slurry reactor 110 can be removed from the system 100 while recovering propylene from these components for recycle of the propylene back to the loop slurry reactor 110.

Aspects of the method include recovering unreacted propylene from the second portion 171 and recycling the recovered propylene via stream 176. This can be accomplished by separating, by a lights column 172 of the propylene recovery system 170, the second portion 171 of the vapor product stream 152 into a lights overhead stream 173 comprising gases lighter than propylene (e.g., nitrogen, hydrogen, oxygen, optional unreacted comonomer of ethylene, or combinations thereof) and into a lights bottom stream 174 comprising the unreacted propylene and heavier hydrocarbons (e.g., one or more of unreacted comonomer, propane, isobutane, pentane, hexane, and heptane); separating, by a heavies column 175 of the propylene recovery system 170, the lights bottom stream 174 into a heavies overhead stream 176 comprising the unreacted propylene and a heavies bottom stream 177 comprising the one or more of the unreacted comonomer, propane, isobutane, hexane, and heptane; and recycling the heavies overhead stream 176 to the loop slurry reactor 110 (e.g., via recycle stream 118). In some aspects, the first portion 154 of the vapor product stream 152 can combine with the heavies overhead stream 176 to form the recycle stream 118.

Aspects of the method can further include flowing polypropylene and residual hydrocarbons in polypropylene product stream 153 to a degassing vessel 160, removing at least some of the residual hydrocarbons from the polypropylene using an inert gas (e.g., introduced to the degassing vessel 160 via gas stream 161), recovering degassed polypropylene in stream 163, flowing degassed hydrocarbons (e.g., comprising the unreacted propylene and one or more of propane, isobutane, and hexane) in stream 162 to a polishing unit 178, recovering the inert gas (e.g., nitrogen) in gas stream 161 and unreacted propylene in stream 179, and combining stream 179 with portion 171 for treatment in the distillation columns 172 and 175. In aspects, a residence time of the polypropylene in the degassing vessel 160 can be from about 1 hrs to about 5 hrs; alternatively, about 2 hrs to about 4 hrs; alternatively, about 2 hrs to about 3 hrs.

In aspects, the polypropylene produced can be a homopolymer (no comonomer utilized in the loop slurry reactor 110), a random copolymer (comonomer utilized in the loop slurry reactor 110), or a block copolymer. In further aspects, the polypropylene produced can be a homopolymer or copolymer that is part of a polypropylene copolymer or block copolymer, where another portion of the polypropylene copolymer or block copolymer is produced in a second reactor that can be a gas phase reactor, solution reactor, or loop slurry reactor. The second reactor can be, for example, placed upstream of the loop slurry reactor 110, and the product of the second reactor can be transferred to the loop slurry reactor 110 for further polymerization of the polypropylene as described herein. Alternatively, the second reactor can be, for example, placed downstream of the loop slurry reactor 110, and the polypropylene in stream 153 or stream 163 can be transferred to the second reactor for further polymerization.

EXAMPLES

The subject matter having been generally described, the following examples are given as particular embodiments of the disclosure and are included to demonstrate the practice and advantages thereof, as well as preferred aspects and features of the inventions. It should be appreciated by those of skill in the art that the techniques disclosed in the examples which follow represent techniques discovered by the inventors to function well in the practice of the inventions, and thus can be considered to constitute preferred modes for its practice. However, those of skill in the art should, in light of the present disclosure, appreciate that many changes can be made in the specific aspects which are disclosed and still obtain a like or similar result without departing from the scope of the inventions of the instant disclosure. It is understood that the examples are given by way of illustration and are not intended to limit the specification of the claims to follow in any manner.

Prophetic Example 1

A simulation of the propylene polymerization system 100 shown in FIG. 1 having the heat exchange system 200 in FIG. 2 was run using Aspen Plus software. The volume of the loop slurry reactor 110 was 48,000 gallons (about 182 m$^3$), and the propylene production rate was 75 ton/hr. The space time yield (STY) for this example was 3.44 lb polypropylene/hr/gallon of the loop slurry reactor 110 (about 0.41 ton polypropylene/hr/m$^3$ of the loop slurry reactor 110).

It was found that the total steam flow rate for the system 100 to produce 75 ton polypropylene/hr at a STY of 3.44 lb polypropylene/hr/gallon of the loop slurry reactor 110 was 16,833 kg steam/hr. Relative to polypropylene production at 75 ton/hr, steam usage amounts to 224 kg steam/ton polypropylene, which is less than the steam usage per ton of polypropylene at a STY that is outside the range disclosed herein.

It was found that the total electricity usage rate for the system 100 to produce 75 ton polypropylene/hr at a STY of 3.44 lb polypropylene/hr/gallon of the loop slurry reactor 110 was 20,211 kW/hr. Relative to polypropylene production at 75 ton/hr, electricity usage amounts to 270 kW/ton polypropylene, which is less than the electricity usage per ton of polypropylene at a STY that is outside the range disclosed herein.

Prophetic Example 2

A simulation of the propylene polymerization system 100 shown in FIG. 1 having the heat exchange system 200 in FIG. 2 was run using Aspen Plus software for a propylene production rate of 90 ton/hr. The volume of the loop slurry reactor 110 was 48,000 gallons (about 182 m$^3$), and the propylene production rate was 90 ton/hr. The space time yield (STY) for this examples was 4.13 lb polypropylene/hr/gallon of the loop slurry reactor 110 (about 0.50 ton polypropylene/hr/m$^3$ of the loop slurry reactor 110).

It was found that the total steam flow rate for the system 100 to produce 90 ton polypropylene/hr at a STY of 4.13 lb polypropylene/hr/gallon of the loop slurry reactor 110 was 20,340 kg steam/hr. Relative to polypropylene production at 90 ton/hr, steam usage amounts to 226 kg steam/ton polypropylene, which is less than the steam usage per ton of polypropylene at a STY that is outside the range disclosed herein.

It was found that the total electricity usage rate for the system 100 to produce 90 ton polypropylene/hr at a STY of 4.13 lb polypropylene/hr/gallon of the loop slurry reactor 110 was 23,130 kW/hr. Relative to polypropylene production at 90 ton/hr, electricity usage amounts to 257 kW/ton polypropylene, which is less than the electricity usage per ton of polypropylene at a STY that is outside the range disclosed herein.

ADDITIONAL DISCLOSURE

The following is provided as additional disclosure for combinations of features and aspects of the present invention.

Aspect 1 is a method comprising polymerizing propylene in a loop slurry reactor under bulk polymerization conditions to produce polypropylene, wherein a space time yield (STY) for the step of polymerizing is greater than 0.36 and less than 0.60 ton polypropylene/hr/m$^3$ of the loop slurry reactor.

Aspect 2 is the method of Aspect 1, further comprising cooling a plurality of vertical legs of the loop slurry reactor with a coolant flowing at a coolant flow rate, cooling the coolant in a heat exchanger positioned externally of the loop slurry reactor so as to control a temperature difference between a first temperature of the coolant entering the heat exchanger and a second temperature of the coolant exiting the heat exchanger, wherein the heat exchanger has a coolant contact surface, and producing polypropylene in the loop slurry reactor at a production rate in a range of from about 75 tons/hr to about 90 tons/hr, wherein one or more of: a ratio of the production rate to the coolant flow rate is in a range of from about 1:40 to about 1:65 tons/hr:m$^3$/hr, a ratio of the production rate to the temperature difference is in a range of from about 11:1 to about 20:1 tons/hr:° C., a ratio of the production rate to a surface area of the coolant contact surface is in a range of from about 0.0352:1 to about 0.637:1 tons/hr:m$^2$, and a ratio of the production rate to the coolant flow rate to the temperature difference is in a range of from about 1:40:0.087 tons/hr:m$^3$/hr:° C. to about 1:65:0.050 tons/hr:m$^3$/hr:° C.

Aspect 3 is the method of Aspect 1 or 2, further comprising cooling the loop slurry reactor with a heat exchange system comprising a plurality of cooling passes and a heat exchanger, wherein each of the plurality of cooling passes is configured to cool only two vertical legs of the loop slurry reactor.

Aspect 4 is the method of Aspect 3, wherein the two vertical legs are parallel to one another.

Aspect 5 is the method of Aspect 3 or 4, wherein each of the two vertical legs is connected to a bend of the loop slurry reactor such that a flowpath extends from a first leg of the two vertical legs, through the bend, and into a second leg of the two vertical legs.

Aspect 6 is the method of any one of Aspects 3 to 5, wherein each of the cooling passes comprises a first cooling jacket of a first leg of the two vertical legs, a second cooling jacket of a second leg of the two vertical legs, a first coolant conduit coupled to an outlet of the heat exchanger to the first cooling jacket, a second coolant conduit connected to the first cooling jacket and to the second cooling jacket, and a third coolant conduit coupled to the second cooling jacket and to an inlet of the heat exchanger.

Aspect 7 is the method of any one of Aspects 3 to 6, wherein the heat exchanger has a coolant contact surface area in a range of about 1,177 m$^2$ to about 2,556 m$^2$.

Aspect 8 is the method of any one of Aspects 1 to 7, wherein the loop slurry reactor has 12 vertical legs.

Aspect 9 is the method of any one of Aspects 3 to 8, wherein cooling the loop slurry reactor with a heat exchange system comprises flowing the coolant through the plurality of cooling passes at a total flow rate of about 3,100 m$^3$/hr to about 5,500 m$^3$/hr.

Aspect 10 is the method of any one of Aspects 1 to 9, further comprising discharging a polymerization product comprising polypropylene from the loop slurry reactor and through at least three continuous take-off valves, the at least three continuous take-off valves having an average discharge flow rate of about 20 to about 30 tons polypropylene/hr/valve.

Aspect 11 is the method of Aspect 10, wherein the at least three continuous take-off valves is three continuous take-off valves, and wherein the average discharge flow rate is about 25 tons polypropylene/hr/valve.

Aspect 12 is the method of Aspect 10, wherein the at least three continuous take-off valves is four continuous take-off valves, and wherein the average discharge flow rate is about 22.5 tons polypropylene/hr/valve.

Aspect 13 is the method of any one of Aspects 10 to 12, wherein an inner diameter of each of the continuous take-off valves is about 1 in to about 3 in.

Aspect 14 is the method of any one of Aspects 1 to 13, further comprising discharging a polymerization product comprising polypropylene from the loop slurry reactor, and flowing the polymerization product through a plurality of flashline heaters to a separator.

Aspect 15 is the method of Aspect 14, wherein each of the plurality of flashline heaters has an overall pressure drop in a range of about 3.89 kPa/m to about 4.97 kPa/m.

Aspect 16 is the method of any one of Aspects 14 to 15, wherein the separator is a cyclone separator.

Aspect 17 is the method of Aspect 16, wherein the cyclone separator is coupled to each of the plurality of flashline heaters by an inlet manifold.

Aspect 18 is the method of Aspect 17, wherein the plurality of flashline heaters comprises three or four flashline heaters, wherein the inlet manifold is configured to connect the three or four flashline heaters to the cyclone separator.

Aspect 19 is the method of any one of Aspects 14 to 18, further comprising separating, in the separator, the polymerization product into a polypropylene product stream and a vapor product stream.

Aspect 20 is the method of Aspect 19, wherein the polymerization product further comprises unreacted propylene, wherein the vapor product stream comprises the unreacted propylene, the method further comprising recycling the unreacted propylene directly to the loop slurry reactor.

Aspect 21 is the method of any one of Aspects 19 to 20, wherein the polymerization product further comprises unreacted propylene and one or more of propane, isobutane, hexane, oxygen, nitrogen, and hydrogen, wherein the vapor product stream comprises the unreacted propylene and the one or more of propane, isobutane, hexane, nitrogen, and hydrogen, the method further comprising splitting the vapor product stream into a first portion and a second portion, recycling the first portion directly to the loop slurry reactor, and flowing the second portion to a propylene recovery system.

Aspect 22 is the method of Aspect 21, further comprising separating, by a lights column of the propylene recovery system, the second portion of the vapor product stream into a lights overhead stream comprising nitrogen and hydrogen and into a lights bottom stream comprising the unreacted propylene and one or more of propane, isobutane, and hexane, and separating, by a heavies column of the propylene recovery system, the lights bottom stream into a heavies overhead stream comprising the unreacted propylene and a heavies bottom stream comprising the one or more of propane, isobutane, and hexane, and recycling the heavies overhead stream to the loop slurry reactor.

Aspect 23 is a propylene polymerization system comprising a loop slurry reactor having a plurality of vertical legs and a plurality of bends, each vertical leg being coupled to an adjacent vertical leg by one of the plurality of bends, and a heat exchange system comprising a plurality of cooling passes and a heat exchanger, wherein each cooling pass is coupled to the heat exchanger and configured to cool only two of the plurality of vertical legs.

Aspect 24 is the propylene polymerization system of Aspect 23, wherein each of the plurality of cooling passes comprises a first cooling jacket wrapped around a first vertical leg of the plurality of vertical legs, a second cooling jacket wrapped around a second vertical leg of the plurality of vertical legs, a first coolant conduit coupled to an outlet of the heat exchanger and to the first cooling jacket, a second coolant conduit connected to the first cooling jacket and to the second cooling jacket, and a third coolant conduit coupled to the second cooling jacket and to an inlet of the heat exchanger.

Aspect 25 is the propylene polymerization system of any one of Aspects 23 to 24, wherein the heat exchanger has a coolant contact surface area in a range of about 1,177 m² to about 2,556 m².

Aspect 26 is a propylene polymerization system comprising a loop slurry reactor, a plurality of continuous take-off valves, wherein each of the plurality of continuous take-off valves is fluidly coupled to the loop slurry reactor, a plurality of flashline heaters, wherein each of the plurality of flashline heaters has an end fluidly coupled to one of the plurality of continuous take-off valves, an inlet manifold having an inlet side connected to an opposite end of each of the plurality of flashline heaters, and a separator connected to an outlet side of the inlet manifold.

Aspect 27 is the propylene polymerization system of Aspect 26, wherein the inlet manifold comprises a plurality of inlet flanges on the inlet side, wherein each of the inlet flanges is connected to one of the plurality of flashline heaters, an outlet flange on the outlet side, wherein the outlet flange has a plurality of outlet holes formed therein, a plurality of conduits, each of the plurality of conduits having an end connected to one of the plurality of inlet flanges and an opposite end connected to one of the plurality of outlet holes formed in the outlet flange, and a support member having a plurality of support holes formed therein, wherein each of the plurality of conduits extends through one of the plurality of support holes.

Aspect 28 is the propylene polymerization system of Aspect 27, wherein the plurality of inlet flanges consists of four inlet flanges, the plurality of conduits consists of four conduits, the plurality of support holes consists of four support holes, the plurality of outlet holes consists of four outlet holes, and the plurality of flashline heaters consists of four flashline heaters.

Aspect 29 is the propylene polymerization system of any one of Aspects 27 to 28, wherein a distance between the support member and the inlet side of the inlet manifold is about 150 mm to about 200 mm.

Aspect 30 is the propylene polymerization system of any one of Aspects 27 to 29, wherein each of the plurality of conduits is tapered such that ends of the plurality of conduits are spaced apart by a first distance that is greater than a second distance by which opposite ends are spaced apart.

Aspect 31 is the propylene polymerization system of any one of Aspects 27 to 30, wherein each of the plurality of conduits extends through each corresponding outlet hole of the plurality of outlet holes such that the opposite end of each of the plurality of conduits has a portion that extends outside the corresponding outlet hole on the outlet side of the outlet flange.

While embodiments of the disclosure have been shown and described, modifications thereof can be made without departing from the spirit and teachings of the invention. The embodiments and examples described herein are exemplary only, and are not intended to be limiting. Many variations and modifications of the invention disclosed herein are possible and are within the scope of the invention.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, 5, 6, . . . ; greater than 0.10 includes 0.11, 0.12, 0.13, 0.14, 0.15, . . . ). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent . . . 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of.

Accordingly, the scope of protection is not limited by the description set out above but is only limited by the claims which follow, that scope including all equivalents of the subject matter of the claims. Each and every claim is incorporated into the specification as an aspect of the present invention. Thus, the claims are a further description and are an addition to the detailed description of the present invention.

What is claimed is:

1. A method comprising:
   polymerizing propylene in a loop slurry reactor under bulk polymerization conditions to produce polypropylene;
   wherein a space time yield (STY) for the step of polymerizing is greater than 0.36 and less than 0.60 ton polypropylene/hr/m³ of the loop slurry reactor.

2. The method of claim 1, further comprising:
   cooling a plurality of vertical legs of the loop slurry reactor with a coolant flowing at a coolant flow rate;
   cooling the coolant in a heat exchanger positioned externally of the loop slurry reactor so as to control a temperature difference between a first temperature of the coolant entering the heat exchanger and a second temperature of the coolant exiting the heat exchanger, wherein the heat exchanger has a coolant contact surface;

producing polypropylene in the loop slurry reactor at a production rate in a range of from about 75 tons/hr to about 90 tons/hr;

wherein a first ratio of the production rate to the coolant flow rate is in a range of from about 1:40 to about 1:65 tons/hr:m$^3$/hr;

wherein a second ratio of the production rate to the temperature difference is in a range of from about 11:1 to about 20:1 tons/hr:° C.;

wherein a third ratio of the production rate to a surface area of the coolant contact surface is in a range of from about 0.0352:1 to about 0.637:1 tons/hr:m$^2$; and wherein a fourth ratio of the production rate to the coolant flow rate to the temperature difference is in a range of from about 1:40:0.087 tons/hr:m$^3$/hr:° C. to about 1:65: 0.050 tons/hr:m$^3$/hr:° C.

3. The method of claim 1, further comprising:
cooling the loop slurry reactor with a heat exchange system comprising a plurality of cooling passes and a heat exchanger, wherein each of the plurality of cooling passes is configured to cool only two vertical legs of the loop slurry reactor, wherein the two vertical legs are parallel to one another, wherein each of the two vertical legs is connected to a bend of the loop slurry reactor such that a flowpath extends from a first leg of the two vertical legs, through the bend, and into a second leg of the two vertical legs.

4. The method of claim 3, wherein each of the cooling passes comprises a first cooling jacket of a first leg of the two vertical legs, a second cooling jacket of a second leg of the two vertical legs, a first coolant conduit coupled to an outlet of the heat exchanger to the first cooling jacket, a second coolant conduit connected to the first cooling jacket and to the second cooling jacket, and a third coolant conduit coupled to the second cooling jacket and to an inlet of the heat exchanger, wherein the heat exchanger has a coolant contact surface area in a range of about 1,177 m$^2$ to about 2,556 m$^2$, wherein the loop slurry reactor has 12 vertical legs.

5. The method of claim 3, wherein cooling the loop slurry reactor with a heat exchange system comprises:
flowing the coolant through the plurality of cooling passes at a total flow rate of about 3,100 m$^3$/hr to about 5,500 m$^3$/hr.

6. The method of claim 1, further comprising:
discharging a polymerization product comprising polypropylene through three or four continuous take-off valves, the three or four continuous take-off valves having an average discharge flow rate of about 20 to about 30 tons polypropylene/hr/valve.

7. The method of claim 6, wherein an inner diameter of each of the continuous take-off valves is about 1 in to about 3 in.

8. The method of claim 1, further comprising:
discharging a polymerization product comprising polypropylene from the loop slurry reactor; and
flowing the polymerization product through a plurality of flashline heaters to a cyclone separator, wherein the cyclone separator is coupled to each of the plurality of flashline heaters by an inlet manifold.

9. The method of claim 8, wherein each of the plurality of flashline heaters has an overall pressure drop in a range of about 3.89 kPa/m to about 4.97 kPa/m.

10. The method of claim 8, wherein the polymerization product further comprises unreacted propylene, the method further comprising:
separating, in the cyclone separator, the polymerization product into a polypropylene product stream and a vapor product stream comprising the unreacted propylene; and
recycling the unreacted propylene directly to the loop slurry reactor.

11. The method of claim 10, wherein the polymerization product further comprises one or more of propane, isobutane, hexane, oxygen, nitrogen, and hydrogen, wherein the vapor product stream further comprises the one or more of propane, isobutane, hexane, nitrogen, and hydrogen, the method further comprising:
splitting the vapor product stream into a first portion and a second portion;
recycling the first portion directly to the loop slurry reactor; and
flowing the second portion to a propylene recovery system.

12. The method of claim 11, further comprising:
separating, by a lights column of the propylene recovery system, the second portion of the vapor product stream into a lights overhead stream comprising nitrogen and hydrogen and into a lights bottom stream comprising the unreacted propylene and one or more of propane, isobutane, and hexane;
separating, by a heavies column of the propylene recovery system, the lights bottom stream into a heavies overhead stream comprising the unreacted propylene and a heavies bottom stream comprising the one or more of propane, isobutane, and hexane; and
recycling the heavies overhead stream to the loop slurry reactor.

13. A propylene polymerization system comprising:
a loop slurry reactor having a plurality of vertical legs and a plurality of bends, each vertical leg being coupled to an adjacent vertical leg by one of the plurality of bends; and
a heat exchange system comprising a plurality of cooling passes and a heat exchanger, wherein each cooling pass is coupled to the heat exchanger and configured to cool only two of the plurality of vertical legs, wherein each of the plurality of cooling passes comprises:
a first cooling jacket wrapped around a first vertical leg of the plurality of vertical legs;
a second cooling jacket wrapped around a second vertical leg of the plurality of vertical legs;
a first coolant conduit coupled to an outlet of the heat exchanger and to the first cooling jacket;
a second coolant conduit connected to the first cooling jacket and to the second cooling jacket; and
a third coolant conduit coupled to the second cooling jacket and to an inlet of the heat exchanger.

14. The propylene polymerization system of claim 13, wherein the heat exchanger has a coolant contact surface area in a range of about 1,177 m$^2$ to about 2,556 m$^2$.

15. A propylene polymerization system comprising:
a loop slurry reactor;
a plurality of continuous take-off valves, wherein each of the plurality of continuous take-off valves is fluidly coupled to the loop slurry reactor;
a plurality of flashline heaters, wherein each of the plurality of flashline heaters has an end fluidly coupled to one of the plurality of continuous take-off valves;

an inlet manifold having an inlet side connected to an opposite end of each of the plurality of flashline heaters; and a separator connected to an outlet side of the inlet manifold.

16. The propylene polymerization system of claim 15, wherein the inlet manifold comprises:

a plurality of inlet flanges on the inlet side, wherein each of the inlet flanges is connected to one of the plurality of flashline heaters;

an outlet flange on the outlet side, wherein the outlet flange has a plurality of outlet holes formed therein;

a plurality of conduits, each of the plurality of conduits having an end connected to one of the plurality of inlet flanges and an opposite end connected to one of the plurality of outlet holes formed in the outlet flange; and a support member having a plurality of support holes formed therein, wherein each of the plurality of conduits extends through one of the plurality of support holes.

17. The propylene polymerization system of claim 16, wherein the plurality of inlet flanges consists of four inlet flanges, the plurality of conduits consists of four conduits, the plurality of support holes consists of four support holes, the plurality of outlet holes consists of four outlet holes, and the plurality of flashline heaters consists of four flashline heaters.

18. The propylene polymerization system of claim 16, wherein a distance between the support member and the inlet side of the inlet manifold is about 150 mm to about 200 mm.

19. The propylene polymerization system of claim 16, wherein each of the plurality of conduits is tapered such that ends of the plurality of conduits are spaced apart by a first distance that is greater than a second distance by which opposite ends are spaced apart.

20. The propylene polymerization system of claim 16, wherein each of the plurality of conduits extends through each corresponding outlet hole of the plurality of outlet holes such that the opposite end of each of the plurality of conduits has a portion that extends outside the corresponding outlet hole on the outlet side of the outlet flange.

* * * * *